United States Patent [19]

Mohrbacker

[11] Patent Number: 4,588,201
[45] Date of Patent: May 13, 1986

[54] HYDRAULIC SYSTEM FOR AN AUXILIARY LOAD TRANSFER DEVICE

[75] Inventor: William J. Mohrbacker, Milwaukee, Wis.

[73] Assignee: Rexworks Inc., Milwaukee, Wis.

[21] Appl. No.: 687,007

[22] Filed: Dec. 28, 1984

[51] Int. Cl.[4] .............................................. B62D 61/12
[52] U.S. Cl. ............................ 280/405 R; 180/24.02; 280/81 R; 280/43.23
[58] Field of Search ............... 280/405 R, 405 A, 407, 280/408, 43.23, 81 R, 81 A; 180/24.02

[56] References Cited

U.S. PATENT DOCUMENTS

| | | | |
|---|---|---|---|
| 3,317,193 | 5/1967 | Buelow et al. | 280/81 R X |
| 3,877,715 | 4/1975 | Thayer et al. | 280/43.23 X |
| 3,912,293 | 10/1975 | Harbers | 280/405 R X |
| 4,195,856 | 4/1980 | Larson et al. | 180/24.02 X |

Primary Examiner—John J. Love
Assistant Examiner—Charles R. Watts

[57] ABSTRACT

A hydraulic system for an auxiliary load transfer device pivotally connected to the rear of a truck includes a sequence valve for preventing the build-up of excess fluid pressure in the main hydraulic line between a pump and a hydraulic cylinder that operates the load transfer device. The sequence valve is operable in response to the difference in pressure between the main hydraulic line and control pressure that controls the output pressure of the pump. The sequence valve opens to direct fluid from the main hydraulic line to tank to prevent the rear wheels of the truck from weaving or wandering during travel.

5 Claims, 2 Drawing Figures

HYDRAULIC SYSTEM FOR AN AUXILIARY LOAD TRANSFER DEVICE

BACKGROUND OF THE INVENTION

The present invention relates to hydraulic systems, and more particularly to a hydraulic system for an auxiliary load transfer device connected to the rear of a truck.

Auxiliary load transfer devices for trucks generally include an axle with a pair of wheels thereon pivotally mounted to the rear of a truck such as a concrete mixing truck. The auxiliary load transfer device is employed to relieve the conventional rear wheels of the truck of some of the truck weight and to transfer some of the truck weight from the rear wheels to the truck's front wheels. In order to accomplish this, a hydraulic cylinder is interposed between the truck and the load transfer device and is operable through a hydraulic circuit to raise the auxiliary axle when not in use or to lower the auxiliary axle and provide selected support of the rear of the truck. An example of an auxiliary load transfer device and the hydraulic circuitry therefore can be found in U.S. Pat. No. 4,084,833.

It has been found that when the auxiliary load transfer device is in use and the truck is driven up an incline or over a bumpy road so that the wheels of the auxiliary device drop below the rear wheels of the truck, the truck driver may feel a weaving or wandering of the rear of the truck. This weaving or wandering may occur because the pressure in the main hydraulic line leading to the hydraulic cylinder gradually increases each time the wheels of the auxiliary axle drop below the rear wheels of the truck since the pump automatically increases its output pressure each time this occurs. As a result, more pressure is applied against the load transfer device than is desired. This transfers too much of the truck weight to the truck's front wheels thus resulting in a feeling of weaving or wandering of the truck during travel.

It is therefore an object of the present invention to provide a means for preventing the build-up of excess pressure in the main hydraulic line between the pump and hydraulic cylinder so as to prevent weaving or wandering of the rear of the truck.

SUMMARY OF THE INVENTION

A hydraulic system for an auxiliary load transfer device pivotally connected to the rear of a truck. The hydraulic system includes means for preventing the build-up of excess pressure in the main hydraulic line between a pump and a hydraulic cylinder that is operable to raise or lower the load transfer device to selectively support the rear of the truck. The valve means includes a sequence valve operable in response to the difference in pressure between the main hydraulic line and a predetermined control pressure between a normally closed position and an open position wherein fluid is directed from the main hydraulic line to tank. The sequence valve thus maintains the desired output pressure in the main hydraulic line irregardless of the position of the auxiliary load transfer device with respect to the rear wheels of the truck.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
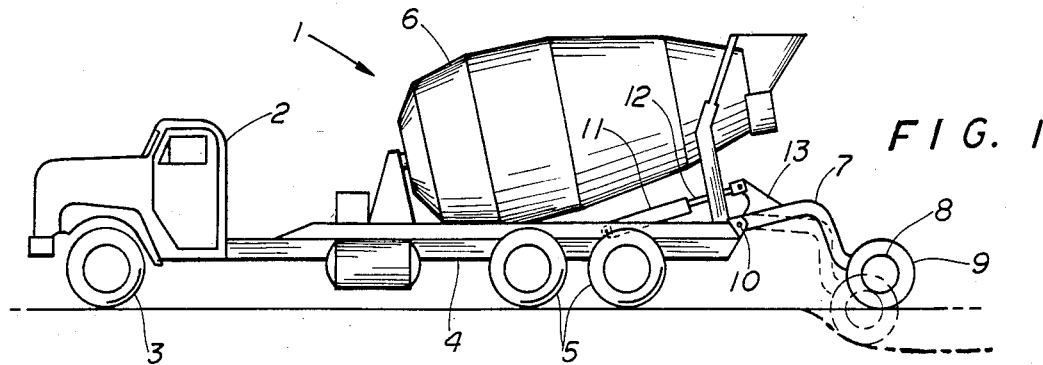
FIG. 1 is a side view in elevation of a concrete mixing truck incorporating an auxiliary load transfer device shown in its louvered operational position.

Referring now to the drawings, a concrete mixing truck generally designated by the numeral 1 includes a truck cab 2 having front steerable wheels 3, a rearwardly extending frame 4 and rear wheels 5 driven by the truck engine. Frame 4 carries an inclined concrete mixing drum 6 which is rotated through a drive mechanism (not shown) by the truck engine. The center of gravity of drum 6 when loaded is only slightly forward of the tandem rear wheels 5 such that front wheels 3 are relatively unloaded. Frame 4 also carries an auxiliary load transfer device which includes a frame extension 7 having an auxiliary axle 8 mounted at its rearward end that carries a pair of auxiliary wheels 9 (only one of which is shown). The forward end of frame extension 7 is pivotally connected, as at 10, to the rear end of truck frame 4.

A hydraulic cylinder 11 located beneath drum 6 provides for pressurizing wheels 9 in a conventional manner, as will hereinafter be described, to relieve wheels 5 of some of the truck weight and to transfer some of the truck weight from wheels 5 to front wheels 3. Cylinder 11 also provides for raising or elevating frame 7 and wheels 9 when not required, as for example when small loads are being transported. In order to accomplish this, the closed end of cylinder 11 is pivotally connected to frame 4 of truck 2 and piston rod 12 of cylinder 11 is pivotally connected to a lever arm 13 projecting from frame extension 7. Thus, when rod 12 is retracted frame extension 7 and wheels 9 are raised to an elevated position adjacent mixing drum 6, and when rod 12 is extended, frame extension 7 and wheels 9 are lowered to their operational position to relieve wheels 5 of some of the truck weight depending upon the amount of pressure applied to rod 12.

Figure 2:
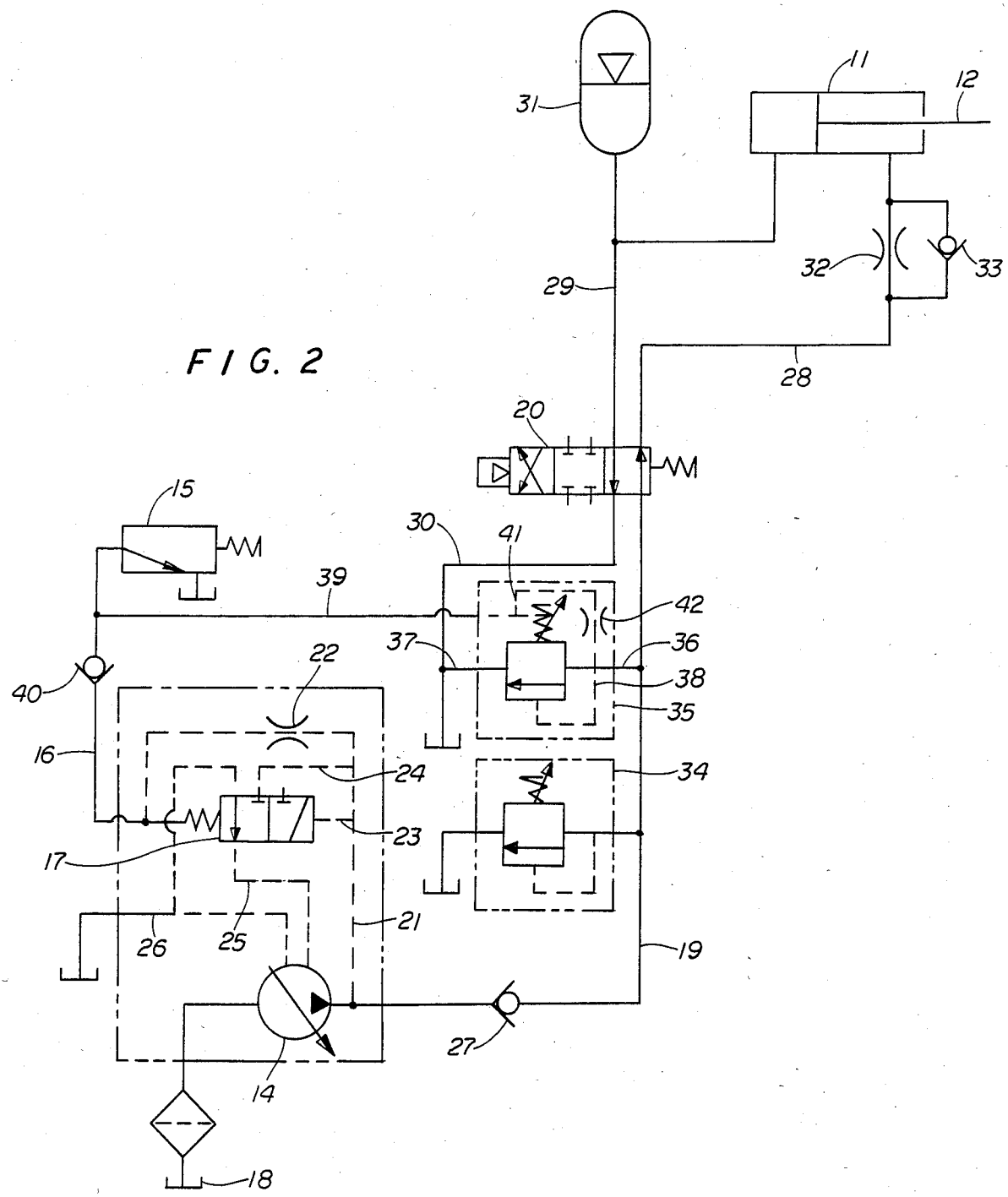
FIG. 2 is a schematic diagram of a hydraulic circuit incorporating a sequence valve in accordance with the present invention for operating the auxiliary load transfer device shown in FIG. 1.

Referring now to FIG. 2, there is shown a hydraulic circuit for operating cylinder 11. The hydraulic system includes a variable displacement pump 14 that is driven by the engine of truck 2. The output pressure of pump 14 is selectively controlled by a manually adjustable control 15. Control 15 is in the form of a manually adjustable relief valve with one side leading to tank and the other side connected via hydraulic line 16 to the spring chamber of a spring returned, three-way valve 17 which is integral with pump 14. The output of pump 14 from tank 18 is directed through a main hydraulic line 19 to a main control valve 20, and also communicates via pilot line 21 and line 16. An orifice or restriction 22 is located in line 21 and provides a pressure drop of approximately 200 psi so that the output pressure from pump 14 is always about 200 psi greater than the pressure in line 16. Hydraulic lines 23 and 24 which interconnect valve 17 with pilot line 21, and hydraulic lines 25 and 26 which interconnect pump 14 with valve 17 and tank 18, respectively, function in the convention manner to open valve 17 and control the position of the swash plate of pump 14 which is normally biased to its fully open position. Thus, as pump 14 is stroked on, the pressure in main line 19 increases until the pressure in line 16 reaches the setting of control 15 at which time control 15 opens to control the output pressure in main line 19, as is conventional. A check valve 27 is disposed in main line 19 to only permit fluid flow from pump 14 to main control valve 20.

Main control valve 20 is a pilot operated, spring returned, four-way, three position valve. Valve 20 is shown in FIG. 2 in its spring returned position which allows fluid flow from main line 19 to a hydraulic line 28 which leads to the rod end of cylinder 11. The cylinder end of cylinder 11 is connected by a hydraulic line 29 to control valve 20 and then by a hydraulic line 30 to tank 18. In the position shown in FIG. 2 for valve 20, the selective pressure from pump 14 retracts rod 12 of cylinder 11 and raises the frame extension 7 and auxiliary wheels 9 to an elevated non-operational position. The center position of valve 20 stops the fluid flow from pump 14 to cylinder 11, and the fully pilot operated position of valve 20 applies the selected pressure from pump 14 to extend rod 12 of cylinder 11 and apply a given downward force to auxiliary wheels 9 which provides the desired weight transfer effect.

A gas charged accumulator 31 is connected to line 29 so that fluid displacement due to variations in the elevation of wheel tracking effects only momentary, minimal variations in back pressure. A flow control valve including a parallel orifice or restriction 32 and one way check valve 33 is disposed in hydraulic line 28. The parallel restriction 32 and one way valve 33 function to maintain some pressure in line 28 at all times. Also, when lowering frame extension 7 and auxiliary wheels 9, hydraulic fluid must pass through restriction 32 which prevents extension 7 and wheels 9 from dropping rapidly.

A main relief valve 34 is connected to line 19 and functions in the conventional manner to direct fluid from line 19 to tank 18 should the pressure in line 19 increase over the maximum desired. Typically, valve 34 is set at about 200 psi over the maximum desired operating pressures for line 19.

In operation, if auxiliary wheels 9 drop below rear wheels 5 of truck 2, such as for example when truck 1 is driven up a relatively steep inclined road or a bumpy road as illustrated in FIG. 1, piston rod 12 of cylinder 11 extends slightly which reduces the pressure in lines 29 and 19. This reduced pressure is sensed by pump 14 which in turn increases its output pressure to the desired setting of control 15. The output pressure from pump 14 thus increases slightly each time auxiliary wheels 9 drop below rear wheels 5. This changes the actual weight transfer effect of wheels 9 with respect to the desired weight transfer effect for wheels 9 so that wheels 9 are actually transferring more weight than desired to front wheels 3. As this undesired weight transfer continues to occur, the rear end of truck 1 may begin to weave or wander during travel since most of the weight of the truck has been transferred to front wheels 3 and auxiliary wheels 9.

In order to prevent the build up of pressure in line 19, the hydraulic system includes a sequence valve 35 located between relief valve 34 and main control valve 20. The inlet of sequence valve 35 is connected via line 36 to main line 19 while the outlet of valve 35 is connected via line 37 to hydraulic line 30. Sequence valve 35 includes pilot line 38 which communicates with line 36 in the conventional manner to open valve 35 at the desired valve setting. Another hydraulic line 39 communicates between the spring chamber of sequence valve 35 and hydraulic line 16. Line 39 is connected to line 16 at a location between control 15 and a check valve 40 in line 16. Check valve 40 prevents any fluid flow from line 39 to pump 14. Sequence valve 35 also includes a second pilot line 41 communicating between inlet line 36 and hydraulic line 39. Pilot line 41 includes an orifice or restriction 42 which allows fluid leakage from the control side of valve 35 to line 39.

In operation, sequence valve 35 is normally closed in the position shown in FIG. 2 preventing fluid flow between lines 19 and 30. However, valve 35 opens to direct fluid from line 19 to line 30 in response to the difference in pressure between line 19 and line 39 depending upon the valve setting. Thus, when the pressure in line 19 is increased to a point where the difference between this pressure and the pressure in line 16 is greater than the valve setting, valve 35 will open and will remain open until the pressure in line 19 is once again about 200 psi greater than the pressure in line 16. At this point, valve 35 closes and the pressure directed to cylinder 11 is once again at the desired setting of control 15 to provide the desired weight transfer effect. Typically the setting of valve 35 may be at 400 psi so that when the pressure differential between line 19 and line 39 is 400 psi or greater valve 35 opens.

Various modes of carrying out the invention are contemplated as being within the scope of the following claims particularly pointing and distinctly claiming the subject matter which is regarded as the invention.

I claim:

1. A hydraulic system for an auxiliary load-transfer device mounted on the rear of a truck, comprising:
   hydraulic cylinder means having opposite ends interposed between the truck and the load-transfer device and operable to provide selected support of the rear of the truck by said load-transfer device;
   pump means operable to provide fluid under pressure to said cylinder means;
   a first hydraulic line interposed between said pump means and one end of said cylinder means;
   a second hydraulic line interposed between the other end of said cylinder means and tank;
   a pump output pressure control means including a third hydraulic line and operable to provide a pressurized fluid control signal in said third line to selectively control output pressure of said pump means in said first line;
   control valve means operable to control the flow of pressurized fluid in said first and second lines to extend and retract said cylinder means; and
   sequence valve means operable in response to the difference in pressure between said first hydraulic line and said third hydraulic line between a closed position and an open position directing fluid from said first line to tank, said sequence valve means is located between said control valve means and said pump means, and said sequence valve is located in a fourth hydraulic line communicating between said first and second hydraulic lines.

2. The hydraulic system of claim 1, wherein said sequence valve includes a spring chamber, and further including a fifth hydraulic line communicating between said spring chamber and said third line.

3. The hydraulic system of claim 1, further including relief valve means located between said sequence valve means and said pump means and operable in response to pressure in said first line between a closed position and an open position directing fluid from said first line to tank.

4. The hydraulic system of claim 4, further including check valve means in said third line, and said fifth line communicates with said third line at a location between said check valve and said pump output pressure control means.

5. A hydraulic system for an auxiliary load-transfer device mounted on the rear of a truck, comprising:
- a hydraulic cylinder having opposite ends interposed between the truck and the load-transfer device and operable to provide selected support of the rear of the truck by said load-transfer device;
- a variable displacement hydraulic pump operable to provide fluid under pressure to said cylinder;
- a normally closed, four-way, three-position control valve operable to control the flow of pressurized fluid from said pump to extend and retract said cylinder;
- a first hydraulic line communicating between said pump and said control valve;
- a second hydraulic line communicating between said control valve and one end of said cylinder;
- a third hydraulic line communicating between the other end of said cylinder and said control valve;
- a fourth hydraulic line communicating between said control valve and tank;
- a manually adjustable pump output pressure control means operable to provide a pressurized fluid control signal to said pump to selectively control output pressure of said pump in said first line;
- a fifth hydraulic line interposed between said pump output pressure control means and said pump for communicating said control signal to said pump;
- a sequence valve including an inlet, an outlet and a spring chamber, and operable in response to the difference in pressure between said first line and said fifth line between a closed position and an open position directing fluid from said first line to tank;
- a sixth hydraulic line communicating between said first line and the inlet of said sequence valve;
- a seventh hydraulic line communicating between the outlet of said sequence valve and said fourth line;
- an eighth hydraulic line communicating between the spring chamber of said sequence valve and said fifth line;
- a check valve in said fifth line located between said eighth line and said pump;
- a relief valve located between said sequence valve and said pump and operable in response to pressure in said first line between a closed position and an open position directing fluid from said first line to tank;
- accummulator means communicating with said third line; and
- a flow control valve including restriction means and check valve means bypassing said restriction means in said second line.

* * * * *